(12) United States Patent
Gong

(10) Patent No.: US 6,418,411 B1
(45) Date of Patent: Jul. 9, 2002

(54) METHOD AND SYSTEM FOR ADAPTIVE SPEECH RECOGNITION IN A NOISY ENVIRONMENT

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/501,885

(22) Filed: Feb. 10, 2000

Related U.S. Application Data
(60) Provisional application No. 60/123,919, filed on Mar. 12, 1999.

(51) Int. Cl.[7] .............................................. G10L 15/06
(52) U.S. Cl. ....................................... 704/256; 704/255
(58) Field of Search ................................ 704/256, 255, 704/226

(56) References Cited

U.S. PATENT DOCUMENTS

| | | | | |
|---|---|---|---|---|
| 5,150,449 A | * | 9/1992 | Yoshida et al. ............. | 704/232 |
| 5,778,342 A | * | 7/1998 | Erell et al. .................. | 704/256 |
| 5,819,223 A | * | 10/1998 | Takagi ........................ | 704/256 |
| 5,970,452 A | * | 10/1999 | Aktas et al. ................. | 704/253 |
| 6,151,573 A | * | 11/2000 | Gong .......................... | 704/256 |
| 6,253,181 B1 | * | 6/2001 | Junqua ........................ | 704/255 |
| 6,266,636 B1 | * | 7/2001 | Kosaka et al. .............. | 704/244 |

* cited by examiner

Primary Examiner—Marsha D. Banks-Harold
Assistant Examiner—Susan McFadden
(74) Attorney, Agent, or Firm—Robert L. Troike; Frederick J. Telecky, Jr.

(57) ABSTRACT

The system uses utterances recorded in low noise condition, such as a car engine off to optimally adapt speech acoustic models to transducer and speaker characteristics and uses speech pauses to adjust the adopted models to a changing background noise, such as when in a car with the engine running.

13 Claims, 1 Drawing Sheet

METHOD AND SYSTEM FOR ADAPTIVE SPEECH RECOGNITION IN A NOISY ENVIRONMENT

This application claims priority under 35 USC 119(e)(1) of provisional application No. 60/123,919 filed Mar. 12, 1999.

FIELD OF INVENTION

This invention relates to speech recognition and more particularly to speech recognition in a noisy environment.

BACKGROUND OF THE INVENTION

The use of cellular phones in a automobile or truck has grown rapidly over the recent few years. It is highly desirable for both the user and others around him for the operation of the cellular phone to be hands free so the user/driver can keep his or her hands on the wheel of the car or truck. In order to do that, the microphone is often placed remotely from the user near the upper left corner of the windshield. As the microphone is placed away from being near the mouth of the speaker, there is an increase in the mismatch conditions. This environment causes acoustic variations in the speech signal which do not carry linguistic information. variations are also caused by different tranducers, channels, speakers and noise backgrounds.

Hands-free speech recognition in automobile is always performed under mismatch condition. There is also speaker variability. A different speaker may use the phone or the speaker's voice changes somewhat. The environment is changing constantly as a function of engine status, road quality, window position and speaking position.

SUMMARY OF THE INVENTION

In accordance with one embodiment of the present invention, a one-time acoustic adaptation of Hidden Markov Models (HMM) in a low noise environment is performed for speaker and acoustic environment and an on-line compensation of HMMs to adjust the models to the utterance specific noise is performed for each incoming utterance.

DESCRIPTION OF PREFERRED EMBODIMENTS OF THE PRESENT INVENTION

Figure 1:
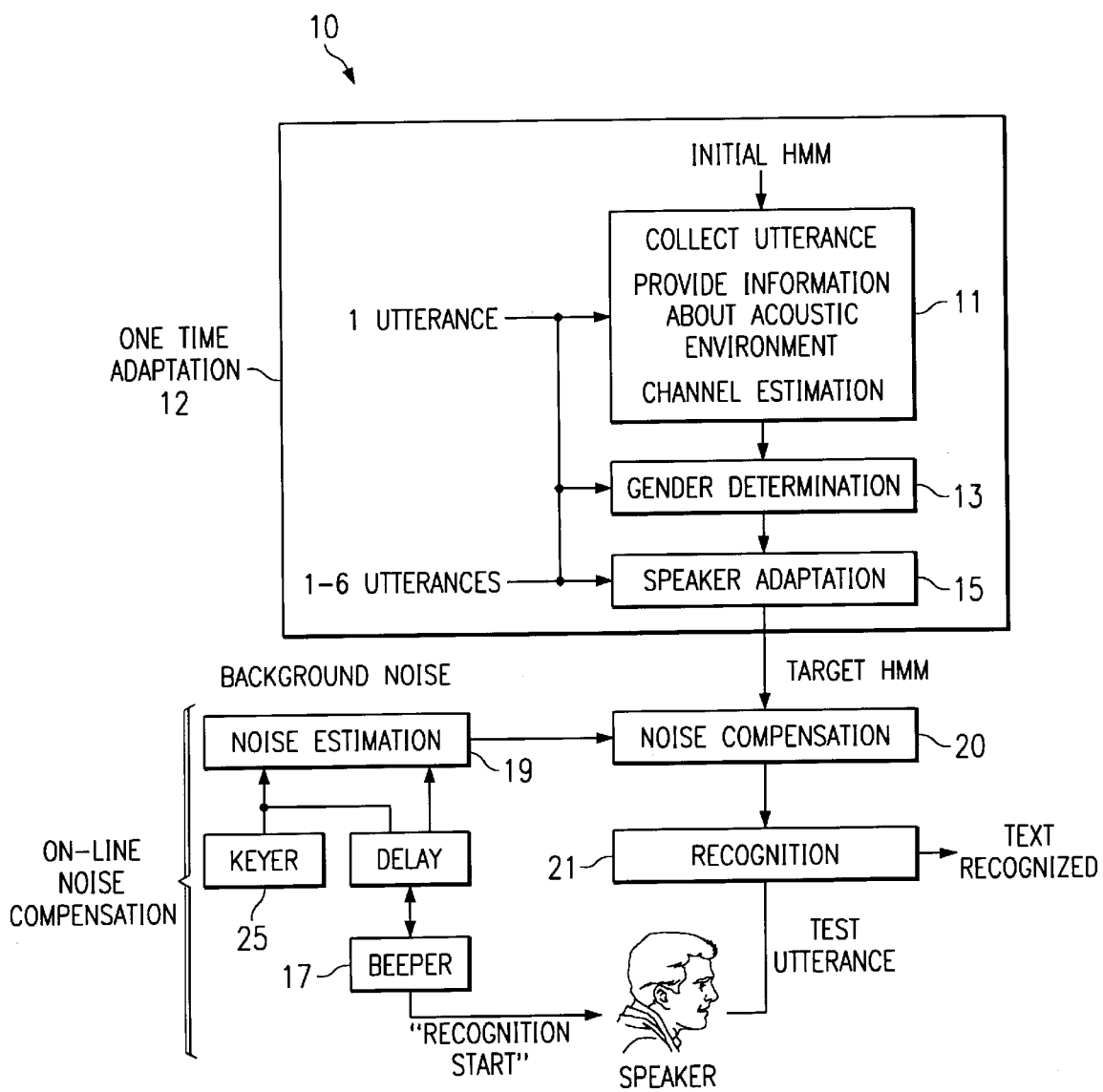
FIG. 1 illustrates the speech recognition system according to one embodiment of the present invention.

Referring to FIG. 1, there is illustrated the system according to one embodiment of the present invention. In the first part of the adaptation, we teach one-time adaptation with the engine off. The one-time adaptation 12 has five steps. The first three steps are channel estimation in FIG. 1. The first step is to collect the first utterance. The second step is to provide information about the recognition acoustic environment, including interior acoustic properties, microphone and speaker characteristics. The third step is the channel estimation step itself. This data is used to compensate convolutive mismatches. With the utterance (utterance 1), the initial speaker-independent HMM is adjusted to optimize the performance for the speaker and the acoustic environment. Cepetral Mean Normalization (CMN) is used during training of the initial models. CMN is discussed by S. Furui, Cepstral analysis technique for automatic speaker verification. IEEE TRANS. ACOUST., *Speech and Signal Processing*, ASSP-29(2): 254–272, April 1981. The initial HMMs are trained with large amounts of data. The mean vector of the utterance is added to the mean vector of all Gaussian distributions of the initial HMM. As the initial HMMs are ceptral mean normalized (CMN), the new HMMs are now compensated for the channel and microphone characteristics.

In accordance with one embodiment of the present invention, gender-dependent phone-based models is used. The fourth step is to determine the gender of the speaker, which allows exclusion of HMMs of the opposite gender in further processing. This is gender determination 13 in FIG. 1. The utterance 1 is recognized using, respectively, male and female HMM models using the mean adjusted models. Let AM (respectively, AF) be the log-likelihood of the utterance obtained with male (female) models that have been adjusted in channel estimation 11. If AM>AF, then gender is assigned as male otherwise female. For the fourth step, we record some additional utterances for speaker adaptation. For the fifth step, we then perform state-dependent mean adaptation for models of the gender as determined above. This is speaker adaptation 15 in FIG. 1.

The output of the adaptation is a set of HMM called target HMM. Note that we are doing supervised adaptation. Therefore, the text of the above utterances must be known. All of the above is done as a one time adaptation and in a low noise environment. One-time adaptation refers to adaptation before use in noisy environment recognition. The result is the target HMM in FIG. 1. For noise compensation according to the present invention, this is done on-line during recognition.

Figure 2:
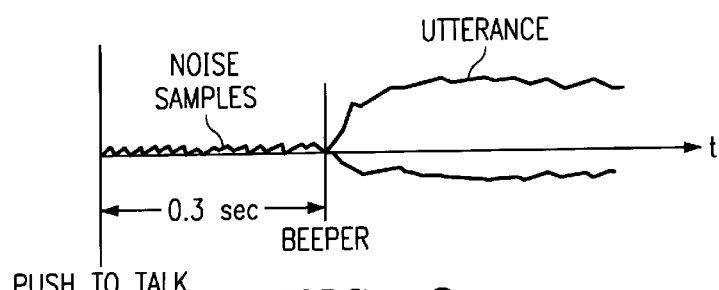
FIG. 2 is a timing diagram illustrating operation of the system of FIG. 1.

Referring to FIG. 2 there is a timing diagram illustrating the operations of the on-line recognition with noise compensation. The system 10 includes for example, a push to-talk switch 25 and a beeper 17, for example, that beeps about 0.3 sec (Delay D) after the push-to-talk switch 25 is pushed. Background noise samples are taken during the period between the key press of the push-to-talk switch and the beeper beeps for receiving an utterance. The background noise is recorded and estimated at noise estimation 19. An on-line model comprising the combination of noise statistics and target HMMs is performed at noise compensation 20, producing noisy HMMs until all mean vectors are compensated. After the "recognition start" beep signal the text is recognized frame by frame at recognition 21 until the end of signal is detected.

In summary, each utterance is recognized by the following procedure:
1. Wait for key press,
2. Record background noise and perform on-line model combination (combine noise statistics and target HMMS to produce noisy HMM) until all mean vectors are compensated,
3. Send "recognition start" beep signal,
4. Recognize, frame by frame, input speech until end of signal is detected,
5. Display the recognized text.

Two model adaptation methods are used. The first is maximum likelihood linear regression (MLLR). The second is parallel model combination (PMC).

For convolutive mismatch we use MLLR framework, which assumes that models for the new environment can be derived by set of state-dependent linear transformations in the parameter space, e.g., cepstral space. MLLR is further discussed in C. J. Leggetter and P. C. Woodland, "Maximum Likelihood Linear Regression for Speaker Adaptation of Continuous Density HMMS," *Computer, Speech and Language*, 9(2):171–185, 1995.

For each Gaussian component of an HMM state, MLLR models the observed vector in any given environment as a linear regression of the mean vector of the distribution. The regression coefficients are optimized using a maximum likelihood (ML) criterion, given a few adaptation utterances.

In this technique a speaker independent (SI) model is used to obtain the alignment of the adaptation utterances of each speaker. This alignment can be either supervised i.e. the orthographic transcription of these utterances is known and the SI model is used to force align them, or it can be unsupervised, i.e. SI model is used to recognize the adaptation utterance. Statistics are collected from the transcribed adaptation data and used to calculate a linear-regression based transformation of the mean vectors of the SI models for each test speaker.

To deal with the problem of sparseness of the available adaptation data, the transformations are shared among states and mixtures; as well as among a group of phonetically similar phones. A phone-to-class mapping is determined for this purpose and all the observations from the set of similar phones are used to derive the transformation for that class. See applicants Y. Gong article entitled "Source Normalization Training for HMM Applied to Noisy Telephone Speech Recognition," in *Proceedings of European Conference on Speech Communication and Technology*, volume 3, pages 1555–1558, Rhodes, Greece, September 1997. The mapping depends on the number of tokens for each phone, observed in the adaptation data. A larger number of tokens results in a larger number of transformations.

The transformation $\Phi_c$ of the class c changes the mean vector of the Gaussian distribution of HMMS according to:

$$\mu_{j,k,h} = \Phi_c \hat{\mu}_{j,k,h} \tag{1}$$

where $\mu_{j,k,h}$ is the transformed mean vector for state j, mixture component k of the HMM h, and $\hat{\mu}_{j,k,h}$ is the original mean vector, which has the form:

$$\hat{\mu} = [w, \mu_1, \mu_2, \ldots \mu_n] \tag{2}$$

where w is the offset of the regression.

The observation probability density of Gaussians mixture HMMs is in the form of:

$$b(o|j,k,h) = \frac{\exp\left(-\frac{1}{2}(o - \phi_c \hat{\mu}_{j,k,h}(o - \phi_c \mu_{j,k,h}))\right)}{(2\pi)^{\frac{n}{2}} |\Sigma j, k, h|^{\frac{1}{2}}} \tag{3}$$

The transformation $\Phi_c$ that maximizes the likelihood is given by the following matrix equation:

$$\sum_{h \in c} \sum_{s \in S_h} \sum_{t \in T_s} \sum_{j \in O_h} \sum_{k \in \alpha_{h,j}} \gamma_{j,k,h}^{(s,t)} \Sigma_{j,k,h}^{-1} O_t^s \hat{\mu} j, k, h = \tag{4}$$

$$\sum_{h \in c} \sum_{s \in S_h} \sum_{t \in T_s} \sum_{j \in O_h} \sum_{k \in \alpha_{h,j}} \gamma_{j,k,h}^{(s,t)} \Sigma_{j,k,h}^{-1} \phi_c \hat{\mu} j, k, h \hat{\mu}'_{j,k,h}$$

In Eq-4, $S_h$ is the set of all segments aligned to the HMM h,
$T_s$ is the utterance frames in the segment s,
$O_t^s$ is the observed incoming vector at time t from the segment s,
$\theta_h$ is the states in the HMM h,
$\alpha_{n,j}$ is all mixture components of HMM h at state j, and
$\gamma_{j,k,h}^{(s,t)}$ is the probability of being in state; at time t with mixture component k, for the segment s of the model h.

Eq-4 represents a linear system of $\Phi_c$ and can be solved by any adequate technique. All HMMs of the Class c are then updated using the new transformation $\Phi_c$.

As MLLR is a special case of source-normalized HLMM (SNHMM), SNHMM is configured to MLLR adaptation.

For the adaptation to additive noises applicants use PMC framework. This is discussed by M. J. F. Gales and S. J. Young, "HMM Recognition in Noise Using Parallel Model Combination," In *Proceedings of European Conference on Speech Communication and Technology*, volume II, pages 837–840, Berlin, 1993. In PMC, an independent noise model is estimated from noise samples collected in the new environment. Distribution by distribution, clean speech model and the noise model are then combined using a mismatch function, to obtain a new speech model matched to the new environment. As advantage, PMC does not require noisy speech data for compensation and all the models are individually compensated.

For additive noise condition, the mismatch function assumes that speech and noise are independent and additive in the time domain. The mismatch function for computing the mean of the new model in the log domain has the form:

$$\hat{\mu}^1 = E\{\log(\exp(s^1) + \exp(n^1))\} \tag{5}$$

where $s^1$ and $n^1$ represent speech and noise observations in the log-domain and their statistics are obtained from appropriate speech and noise state pair. Since Eq-5 does not have a closed form, several approximations may be used, depending on the trade-off between accuracy and hardware requirement. We describe Log-add approximation.

For static parameters, log-add approximation is based on the assumption that the effect of variance of both speech and noise on the estimate can be ignored:

$$\Sigma_{i,j} = 0. \tag{6}$$

Based on log-normal assumption and introducing the gain factor g, from Eq-5 we have:

$$\hat{\mu}_i = \log(g \exp(\mu_i^{log}) + \exp(\overline{\mu}_i^{log})) \tag{7}$$

Only mean vectors are adapted. As variance conversion is not performed, the scheme is more computational efficient. The dynamic parameters are compensated using:
where $$\Delta \hat{\mu}_i^{log} = g \frac{\beta_i}{\beta_i + 1} \Delta \mu_i^{log} \tag{8}$$

$$\beta_i \triangleq \frac{\mu_i^{lin}}{\overline{\mu}_i^{lin}}, \tag{9}$$

is the signal-to-noise ratio expressed in linear scale.

To satisfy real-time adaptation requirement, we developed an on-line version of model combination scheme, referred to as on-line model combination (OMC). During speech pause, OMC procedure adapts a fraction of HMM distributions with a newly estimated noise statistics. Two extreme cases can be possible: only one Gaussian distribution is adapted at each sample frame, or whole set of Gaussians is adapted. OMC can use either of the above-mentioned assumptions, based on available computational resource. Noise estimation is based on a modified MAP estimation of noise mean and variance. See applicant's article Y. Gong, "Experiments on Sequential Determination of Utterance Log-Spectral Mean by Maximum Aposteriori Estimation," Technical Report, TAR, Texas Instruments, November 1997.

System Features

To reduce as much of the mismatch between training and testing environments, we first perform a calibration of the HMM models, which adapts a speaker-independent (SI) HMM model set to a speaker-and-microphone-dependent (SD) model set. Adaptation utterances, typically seven digit sequences, are collected while the engine is off. MLLR is used for its efficient use of small amount of adaptation data.

After calibration, the recognizer is ready to recognize digit sequences. During the pauses where computation resources are available, PMC automatically switches in and adapts the SD model set to a model set that is in addition specific to the background noise (SND)

This model set is then used for speech recognition. No additional adaptation utterance is required at this stage.

Speech acoustic models are trained with speech recorded in quiet environment and adapted to testing environment. Therefore, for training it is not necessary to collect large speech database in the car, which is a costly and unsafe operation.

Through a calibration phase, the recognizer learns to adapt to microphone and speaker. Such a procedure substantially improves recognition rate for speakers, microphones and vehicles that are unseen at the training stage.

During speech pauses, the recognizer constantly adjusts the acoustic models to accommodate to the change back-ground noise. This technique enables the recognizer to work in changing noise background.

The recognizer is phone-based, and therefore easy to be configured for any other (e.g. continuous speech) recognition tasks.

The TI-digits database, down-sampled to 8 kHz, is used for all the experiments. The digit sequences have 1–7 digits. The observation vectors consist of 13 DFT mel-frequency cepstral cueffcienrs (MFCC) along with their regression-based first-order time derivative, derived at a frame rate of 20 ms.

| TYPE | DEL | SUB | INS | WER % | SER % |
|---|---|---|---|---|---|
| log-add | 45 | 125 | 57 | 1.10 | 2.79 |

Table 1: WER using PER-UTTERANCE PMC. Initial model=LPC.cln.mfcc+2+2. No variance adaptation, 0 dB SNR, 20637 words (7562 strings) tested.

The training set consists of 4229 digit sequences (13896 words) from the male speakers and 4385 digit sequences (14400 words) from the female speakers.

The test set consists of 113 speakers, 57 of which are female speakers and 56 are male speakers. The test set consists of 3747 digit sequences (10225 words) from male speakers and 3815 digit sequences (10412 words) from the female speakers. Ten utterances from each test speaker are reserved for MLLR adaptation.

The word error rate (WER) for clean speech is 0.52%.

The additive noise used in the experiments is TI-FRANCE car noise. The noise was scaled and added to the test and adaptation data to simulate 0 dB signal-to-noise ratio (SNR) conditions.

For model combination, we use several noise-only frames immediately before each speech utterance to estimate a noise model and adapts HMMS.

The results are shown in Table-1.

I claim:

1. A method of speech recognition comprising the steps of:
    performing a one time channel adaptation of initial Hidden Markov Models for all successive speech utterances to provide channel adapted Hidden Markov Models;
    determining background noise for each utterance in a time period adjacent speech to be recognized;
    adapting channel adapted Hidden Markov Models to the determined background noise for each utterance to get channel and noise adapted target Hidden Markov Models; and
    recognizing speech adjacent to the determined background noise using said channel and noise adapted target Hidden Markov Models.

2. The method of claim 1 including the step of performing one time gender adaptation of said Hidden Markov Models to provide channel and gender adapted Hidden Markov Models, said adapting step adapts channel and gender adapted Hidden Markov Models to noise to get channel, gender and noise adapted target Hidden Markov Models and said recognizing step uses channel, gender, and noise adapted target Hidden Markov Models.

3. The method of claim 1 including the step of performing one time speaker adaptation of said Hidden Markov Models to provide channel and speaker adapted Hidden Markov Models, said adapting step adapts channel and speaker adapted Hidden Markov Models to noise to get channel, speaker and noise adapted target Hidden Markov Models, said recognizing step uses said channel speaker and noise adapted Hidden Markov Models.

4. The method of claim 3 including the step of providing one time gender adaptation of said Hidden Markov Models to provide channel, gender, and speaker adapted Hidden Markov Models, said adapting step adapts channel, gender, and speaker adapted Hidden Markov Models to noise to get channel, gender, speaker and noise adapted Hidden Markov Models, said recognizing step uses said channel, gender and speaker noise adapted Hidden Markov Models.

5. A method of speech recognition comprising the steps of:
    performing one time channel, then gender, then speaker sequence adaptation of initial Hidden Markov Models for all successive speech utterances to provide target channel, gender, and speaker adapted Hidden Markov Models;
    determining background noise for each utterance in a time period adjacent speech to be recognized;
    adapting target channel, gender, and speaker adapted Hidden Markov Models to the determined background noise to get channel, gender, speaker and noise adapted target Hidden Markov Models; and
    recognizing speech adjacent to the determined background noise using said channel, gender, speaker and noise adapted target Hidden Markov Models.

6. The method of claim 5 wherein the step of determining background noise includes sensing noise just prior to receiving an utterance to be recognized.

7. A method of speech recognition comprising the steps of:
    determining background noise in a time period adjacent speech to be recognized;
    adapting Hidden Markov Models to determine background noise to get noise adapted Hidden Markov Models; and recognizing speech adjacent to the determined background noise using said noise adapted target Hidden Markov Models, said step of determining background noise is just prior to receiving an utterance to be recognized; and said step of determining background noise includes the step of storing background noise after a key to talk switch is operated and before any utterance is received.

8. The method of claim 7 wherein said step of determining background noise includes an alarm indicator for notifying the speaker when to speak for recognition.

9. A system for speech recognition comprising:

a background noise sensor responsive to background noise of the speaker for speech recognition;

a noise adapter responsive to said background noise for adapting Hidden Markov Models to said sensed noise;

a speech recognizer responsive to the speech of said speaker and said noise adapted Hidden Markov Models for recognizing speech of said speaker; and said sensor includes means responsive to a key to talk switch for sensing said noise and delay indicator device for notifying the speaker to speak after keying the speech to talk switch.

10. The system of claim 9 wherein said system includes adaptation of initial Hidden Markov Models in a low noise environment prior to determining background noise at said sensor.

11. The system of claim 10 wherein adaptation of initial Hidden Markov Models includes a channel adapter.

12. The system of claim 11 wherein said adaptation of initial Hidden Markov Models includes a speaker adaptation.

13. The system of claim 12 wherein said adaptation of said Hidden Markov Models includes channel adaptation, gender adaptation and speaker adaptation.

* * * * *